(12) United States Patent
Carter et al.

(10) Patent No.: US 7,213,154 B1
(45) Date of Patent: May 1, 2007

(54) QUERY DATA PACKET PROCESSING AND NETWORK SCANNING METHOD AND APPARATUS

(75) Inventors: Earl Thomas Carter, Manchaca, TX (US); Michael T. Shinn, Centerville, VA (US)

(73) Assignee: Cisco Technology, Inc., San Jose, CA (US)

( * ) Notice: Subject to any disclaimer, the term of this patent is extended or adjusted under 35 U.S.C. 154(b) by 195 days.

(21) Appl. No.: 10/888,487

(22) Filed: Jul. 9, 2004

Related U.S. Application Data

(63) Continuation of application No. 09/432,297, filed on Nov. 2, 1999, now abandoned.

(51) Int. Cl.
*G06F 11/30* (2006.01)

(52) U.S. Cl. .......................... 713/188; 726/22; 726/23; 726/24; 726/25; 709/223; 709/224; 713/160

(58) Field of Classification Search ................ 713/188, 713/160, 188 M, 193; 726/22–25, 3; 709/223–224
See application file for complete search history.

(56) References Cited

U.S. PATENT DOCUMENTS 5,870,479 A * 2/1999 Feiken et al. ............... 713/160
6,088,803 A * 7/2000 Tso et al. ..................... 726/22
6,219,791 B1 * 4/2001 Blanchard et al. .......... 713/201
6,301,668 B1 * 10/2001 Gleichauf et al. .......... 713/201
6,453,345 B2 * 9/2002 Trcka et al. ................. 709/224

* cited by examiner

*Primary Examiner*—T. B. Truong
(74) *Attorney, Agent, or Firm*—Marger Johnson & McCollom, P.C.

(57) ABSTRACT

A method for detecting within a networked computer a target vulnerability such as a Trojan Horse residing therein is disclosed, wherein the vulnerability is characterized by a signature response to an encrypted query. The method includes encrypting a plurality of query data packets in accordance with a plurality of encryption keys, each encrypted query data packet including a defined query field specific to the target vulnerability. The method further includes storing the plurality of encrypted query data packets in a memory. The method further includes thereafter scanning the networked computer for a target vulnerability residing within the networked computer by sending successive ones of the encrypted-and-stored query data packets to the host computer and analyzing responses thereto from the host computer with respect to the characteristic signature. Preferably, the encrypting is performed for substantially all of the encryption keys within a defined key space. The memory may be non-volatile memory such as a disk drive or a volatile memory such as random-access memory (RAM) or a memory configured as a cache.

16 Claims, 4 Drawing Sheets

QUERY DATA PACKET PROCESSING AND NETWORK SCANNING METHOD AND APPARATUS

This application is a continuation of Ser. No. 09/432,297, filed Nov. 2, 1999 now abandoned.

BACKGROUND OF THE INVENTION

This invention relates to the detection of Trojan Horses within a network system, and more specifically to method and apparatus for comprehensive detection of Trojan Horses or other networked computer-related vulnerabilities with minimum processing overhead on the network scanner.

Security vulnerabilities in networked computers are a growing problem and scanning for and detecting the same imposes a high processing overhead on the network scanner. Trojan Horses infect ports within host computers connected via the Internet or like network systems in which access is relatively open to hackers, viruses and other computer piracy. Most Trojan Horses do not respond to a detector probe unless the probe packet is sent with the correct encryption key, which of course is unknown to a scanner. Thus, the scanner must try every possible key in the encryption modulus to ensure detection of the Trojan Horse. Unfortunately, multiple-key detection probing of multiple computers and ports is extremely time consuming. The previously known alternative—testing only a limited subset of the key space or only a limited number of computers or ports—represents an incomplete scan of the networked computers. This less-than-comprehensive prior art approach allows Trojan Horses and other serious network vulnerabilities to lurk undetected or to posture unrecognized.

SUMMARY OF THE INVENTION

A method for detecting within a networked computer a target vulnerability such as a Trojan Horse residing therein is disclosed, wherein the vulnerability is characterized by a signature response to an encrypted query. The method includes encrypting a plurality of query data packets in accordance with a plurality of encryption keys, each encrypted query data packet including a defined query field specific to the target vulnerability. The method further includes storing the plurality of encrypted query data packets in a memory. The method further includes thereafter scanning the networked computer for a target vulnerability residing within the networked computer by sending successive ones of the encrypted-and-stored query data packets to the host computer and analyzing responses thereto from the host computer with respect to the characteristic signature. Preferably, the encrypting is performed for substantially all of the encryption keys within a defined key space. The memory may be non-volatile memory such as a disk drive or a volatile memory such as random-access memory (RAM) or a memory configured as a cache.

The foregoing and other objects, features and advantages of the invention will become more readily apparent from the following detailed description of a preferred embodiment which proceeds with reference to the drawings.

DETAILED DESCRIPTION OF THE PREFERRED EMBODIMENT

Figure 1:
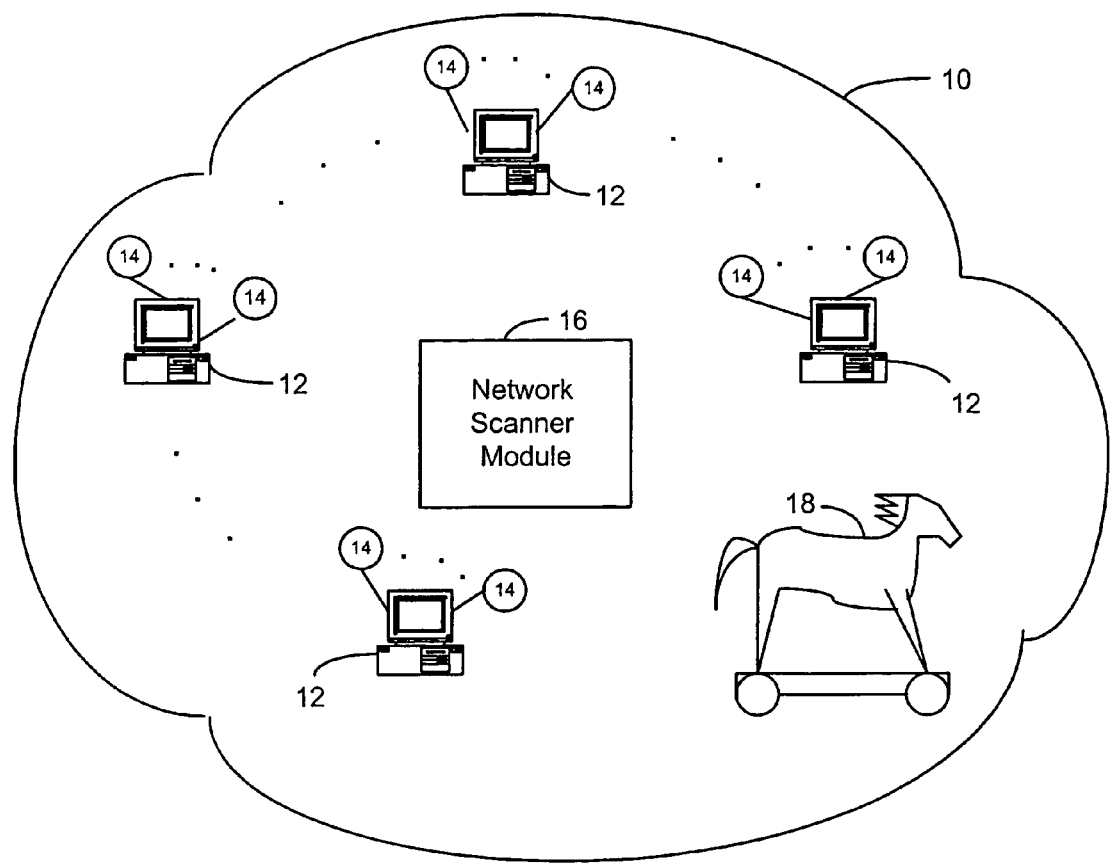
FIG. 1 is a system block diagram illustrating a network system in which data packet pre-processing, encryption and caching are performed in accordance with the invention.

FIG. 1 shows a network 10 having one or more connected computers 12 (wherein for illustration purposes the number of connected computers 12 is c, where c may be typically more than one thousand). Computers 12 each have one or more ports 14 (wherein for illustration purposes the number of ports 14 per computer 12 is p, where p may be typically more than ten thousand). Those of skill in the art will appreciate that there may be thousands of such networks 10, each having thousands of computers 12, each computer 12 having tens of thousands of ports 14. In accordance with the invention, a network scanner module 16 is responsible for managing the security of network 10 against infiltration and performance degradation by software 18 residing and executing on any one or more of the ports 14 on any one or more of the network computers 12.

The type of software 18 that may represent a network vulnerability is typified by Trojan Horse software that initiates or facilitates security breaches of the network. For example, a Trojan Horse may reside and execute in a port 14 and may permit users to access and corrupt software or data residing on any one or more of the remote networked computers 12. In order to ensure the network's invulnerability to such a Trojan Horse, scanner module 16 must detect the Trojan Horse. Then the scanner module may take remedial action. Such action may include recording the existence of the Trojan Horse and logging of the port and computer in the network in which the Trojan Horse is detected. It may further take remedial steps such as informing the affected computer or denying the computer continued access to the network.

Those of skill in the art will appreciate that Trojan Horse is used broadly herein to describe software that resides and executes in a networked computer or port thereof and is capable of compromising the security of networked computers, programs or data files within the network. Typically, the Trojan Horse disguises itself as a remote management tool, remote management tools providing the beneficial ability of an authorized network administrator to monitor and direct traffic on the network. What distinguishes the Trojan Horse from a legitimate remote management tool is that it facilitates access to remote networked computers, programs and data files by unauthorized personnel or programs. In other words, it permits access for purposes of remote management to clients or users for non-administrative purposes or for harmful administrative purposes.

It will also be appreciated that Trojan Horses, however broadly defined herein, are not the only networked computer vulnerabilities addressed by the invention. Other applications software legitimately executing on a networked computer may themselves represent network security and/or performance risks. For example, software bugs that could bring down a port, a computer or an entire network may be detected in accordance with the invention, by pre-generating a query data packet to which the errant software would respond if present. Such software applications may not be the typical culprits in that they may not be illegal, unlawful, unauthorized or simply malicious, but nevertheless they may be detected wherever they may reside, efficiently and quickly, in accordance with the invention. Of course, software bugs within legitimate applications software when discovered may be remedied by update or so-called patches.

Similarly, legitimate applications software that is in simple need of an update that might beneficially increase network performance or client satisfaction and fulfillment also may be targeted in accordance with the invention. Any and all of such uses of the invention are contemplated, and are within the spirit and scope thereof.

A Trojan Horse responds only to properly encrypted queries, i.e. queries encrypted using the proper key within the key space. The key, of course, is unknown to the scanner module. (If the key were known, it would be a trivial task to detect a Trojan Horse.) Yet the number of possible encryption keys is great. The key space length or modulus in some operating system environments such as Windows™ is 32 k (where k is $2^{10}$), while in other operating system environments such as Unix™ the modulus is 64 k. Thus, the query data packet must be encrypted n different ways, wherein n is the modulus. If all possible keys are not used in encrypting the query, a Trojan Horse may go undetected and the security and operation of the network may be compromised.

Because n is large, there is a significant and nearly prohibitive processing overhead to scanning for a Trojan Horse, at least by prior art detection schemes. The difficulty is further multiplied by the number of computers c in a network, e.g. more than a thousand, and the number of ports p in each networked computer, e.g. more than ten thousand. To scan every port in a Win95-based network for a lurking Trojan Horse requires as many as $n*c*p=32\text{ k}*1000*10,000=320$-plus million data packets to be generated and transmitted over the network. Heretofore, packet generation and transmission over the network has been done in a manner that will be referred to herein as on the fly. By this we mean that a query data packet is encrypted in accordance with a first key, then transmitted to the targeted network computer and port. Thereafter, the query data packet is encrypted in accordance with a second key, then the second query data packet is transmitted to the targeted network computer and port. This alternate encryption and transmission continues until the key space is exhausted. Such a prior art process is extremely processor-intensive and tedious, sometimes prohibitively so.

Those skilled in the art may appreciate why prior art scanners have taken short cuts in an attempt to reduce the processing overhead on the scanner. Some prior art scanners probe only selected ports of each networked computer, based upon intelligence information that a given Trojan Horse typically executes on a given port. Other prior art scanners probe using only a few selected keys of the entire key space, based upon intelligence information that a given Trojan Horse typically looks for encryption in accordance with a given key. Trojan Horse and other software that renders a networked computer vulnerable instinctively, in its own survival interest, would change ports and/or keys frequently to avoid detection.

Conventional Trojan Horse detection schemes have scanned only selected few ports of networked computers using only selected few encryption keys. Thus, incomplete scanning of networks has left them vulnerable to Trojan Horses. The principal reason for such incomplete scans has been the extremely high processing overhead of encrypting detection query data packets by every possible one of tens of thousands of encryption keys in a key space or modulus (wherein for illustration purposes the number of keys is n, where n may be typically 32 k (where k is $2^{10}$). When this key factor n is multiplied by the number p or ports and by the number c of computers in a network, the processing time for encrypting a query data packet according to a first encryption key and transmitting it to a given port of a given computer, then encrypting the query data packet according to a second encryption key and transmitting it to the given port of the given computer, and so on for each key and for each computer and for each port therein, is prohibitive. Such conventional network scanning schemes will be referred to herein as involving on-the-fly data packet encryption.

Figure 2:
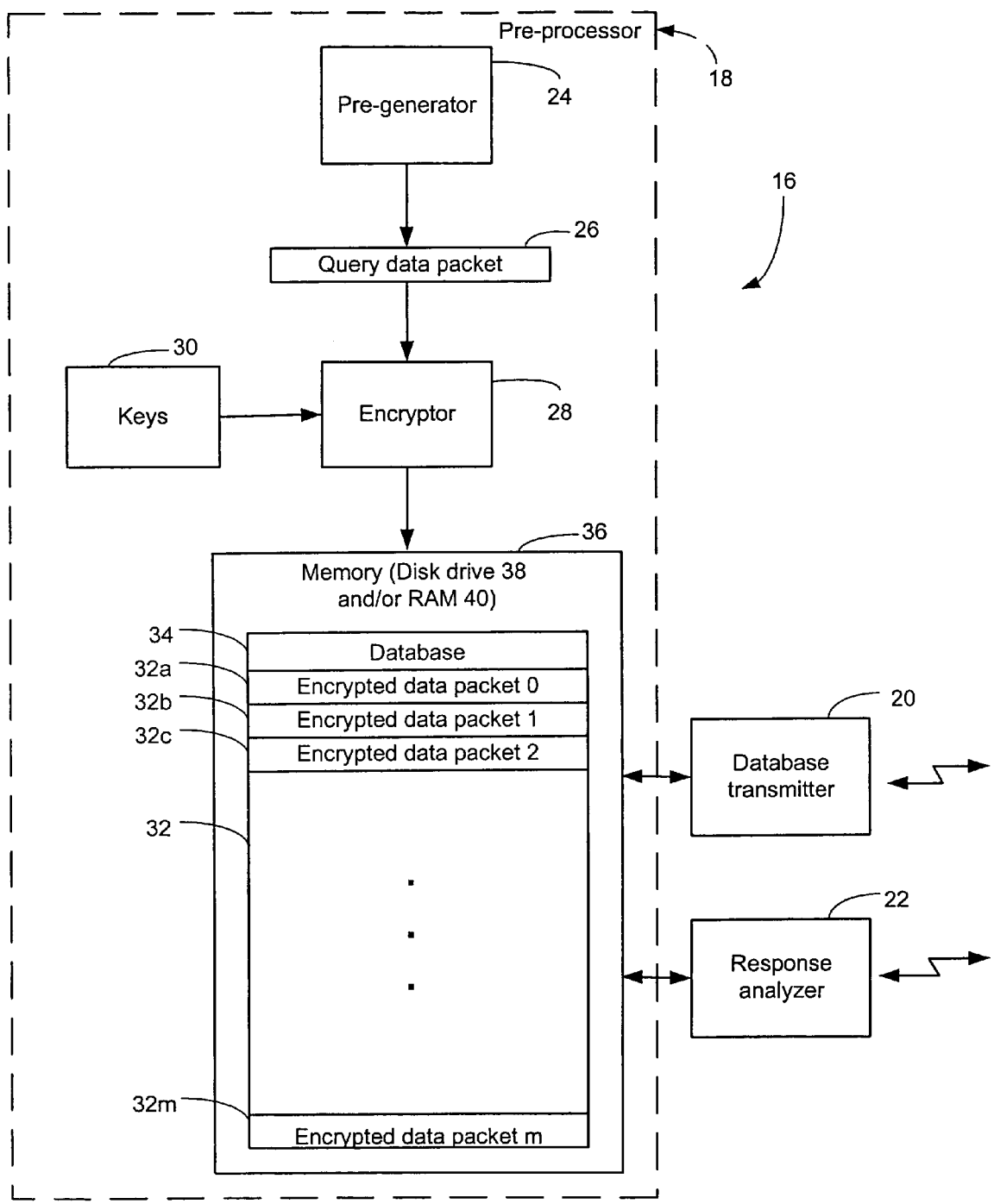
FIG. 2 is a detailed schematic block diagram of the pre-processing, encryption and caching apparatus in accordance with the invention.

FIG. 2 illustrates how scanner module 16 is structured in accordance with the invention to detect Trojan Horses and other network vulnerabilities. Scanner module 16 is configured to eliminate on-the-fly data packet encryption. It may be seen to comprise a pre-processor 18, a database transmitter 20 and a response analyzer 22 compatible with connection to network 10 (not shown in FIG. 2). Pre-processor 18 includes a pre-generator that builds a query data packet 26 and then processes the query data packet in accordance with a defined protocol. The preferred protocol includes encrypting query data packet 26 in accordance with a plurality of keys 30 within a given key space to produce a plurality of encrypted query data packets 32a, 32b, 32c, . . . 32m, where m represents a relatively large number less than or equal to n. Such plural encrypted query data packets 32 are then stored as a database 34 in a memory 36 for later scanning of network 10.

In accordance with a first embodiment of the invention, memory is a non-volatile storage medium, e.g. a disk drive 38. In accordance with a second embodiment of the invention, database 34 is stored in a random-access memory (RAM) 40. In accordance with a third embodiment of the invention, database 34 is stored in a memory that is configured as a cache or cache memory 42 (not shown).

Those of skill in the art will appreciate that database 34 is transportable and communicable as an object among memories and computers. In other words, it can be archived, read from one memory to another, transported via a movable medium such as a diskette or storage module, transmitted between computers or ports over the network, etc. Cache 42 typically may be configured within a dedicated network server charged with monitoring and/or maintaining network security and performance.

In accordance with a preferred embodiment of the invention, database 34 generated by scanner module 16 is uploaded to a dedicated server on the network, e.g. NetSonar™, which is charged with active network security. NetSonar™ then periodically scans network 10. Thus, it will be understood that in accordance with one embodiment of the invention scanner module 16 resides in a dedicated server node within network 10. Those of skill in the art will appreciate that scanner module 16 may take any suitable form and may reside and execute anywhere. Indeed, its various pre-processing, encryption and caching functions may be provided by a dedicated server node or may be distributed across various servers nodes in the network. Any and all suitable configurations are contemplated, and are within the spirit and scope of the invention.

Figure 3:
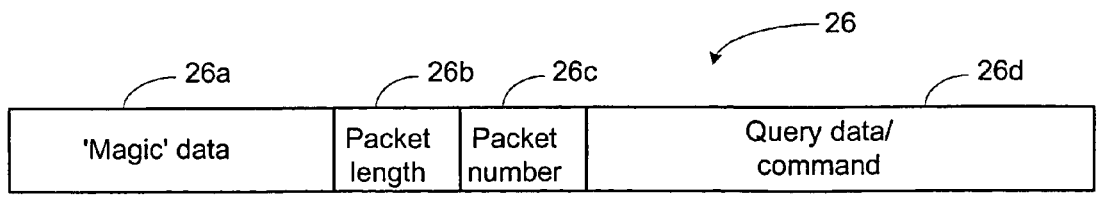
FIG. 3 illustrates a query data packet for use with the apparatus and method of the invention.

FIG. 3 is an illustrative query data packet 26 prior to its having been pre-processed, as by encryption in accordance with the invention. Typical packet 26 includes a so-called 'magic' data field 26a of a given length, e.g. 8 bytes, magic data field 26a being characterized as a banner and being recognizable by the target software that may be found to be residing in the given port. Data packet 26 also includes a packet length field 26b and a packet number field 26c for identification and tracking purposes, as is typical with data packet transmission over the network. Finally, packet 26 includes a dedicated query data/command field 26d containing predefined query data or command to which target software would respond in a predictable way, as a part of its normal query-response protocol, if it resided in the networked computer port. For example, the so-called data packet payload for a particular Trojan Horse may be approximately thirty bytes for a single key within the key space, or under Win95, 10 bytes (B)*32 k keys=96 kB for the entire key space. It will be appreciated that plural ones of such encrypted query data packets 32a, 32b, 32c, . . . 32m are addressed and transmitted to a given port of a networked computer, with each successive packet being encrypted by a different key within a defined key space or modulus.

Most preferably, m equals n, the number of keys in the key space, although m may be less than or equal to n. Because of the far greater efficiency of the invented scanning method and apparatus, it is most preferable to use every key within a given key space. Nevertheless, the invention is useful and advantageous even when it is desired to scan a computer or port in a network using fewer than all keys within a given key space. For example, the most likely dozens or hundreds or thousands or tens of thousands of keys in a given key space may be used to encrypt query data packet 26 into encrypted query data packets 32a, 32b, 32c, . . . 32m. In such a case, m—which is far greater than 1 and represents at least a substantial fraction of the number of keys in the key space—is the number of most likely keys but is less than the entire number of keys n within the key space. The selection of the most likely keys typically is made based upon what will be referred to herein as intelligence information regarding the encryption schemes most likely used by the targeted software. Of course, the selection of keys for scanning may be updated as new intelligence information is obtained.

The method and apparatus of the invention comprehensively scan all ports on all computers, rather than assuming a Trojan Horse resides on a given port or in a given computer. The method and apparatus of the invention scans using a relatively large number of selected keys, and most preferably using all keys within the key space. This is done in accordance with the invention very quickly. This is because the invented method and apparatus pre-process, encrypt and optionally cache the query data packets so that successive data packets once may be readied and stored and quickly and repeatedly may be transmitted over the network to any number of computers and ports therein. The scan-time overhead is minimized and it is possible in accordance with the invention to scan a network for a Trojan Horse in minutes what would otherwise take hours, and to scan in hours what would otherwise take weeks.

It will be appreciated that encrypted query data packets 32 may be addressed by scanner module 16 to target any desired piece of software that may be found to be executing within a networked computer 12. In order to ensure that each of plural ports 14 in a networked computer 12 is scanned for the target software, plural scans are made. Each successive scan is with the same pre-processed, encrypted, stored query data packet database addressed to successive ones of the plural target ports 14.

Figure 4:
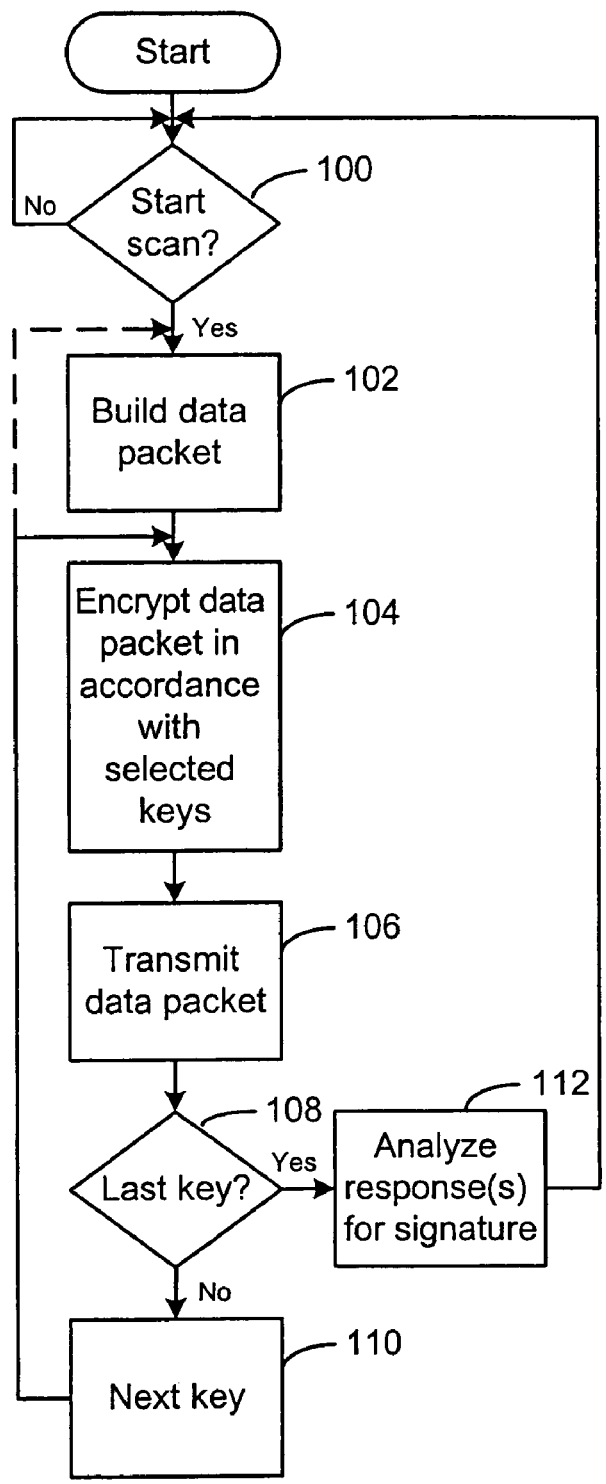
FIG. 4 is a flow chart illustrating the prior art method of scanning for Trojan Horses.

FIG. 4 is a flow chart of a prior art scanning scheme used to detect Trojan Horses. In accordance with the prior art scheme, it is determined at 100 whether it is time to start a network scan for a Trojan Horse or other vulnerability. Upon the start of a scan, a query data packet is built at 102. At 104, the query data packet is encrypted in accordance with one of the selected keys. The encrypted query data packet is transmitted at 106 to the target network computer or port. At 108, it is determined whether the last key has been used to encrypt and transmit a query data packet. Until all of the selected keys have been used, as determined at 108, the processes of encrypting (104) and transmitting (106) are repeated. When the last key is used, one or more responses from the target network computer or port is awaited at 112. If there is a response within a defined time out, then it is determined also at 112 whether the response is a signature response indicating detection of a Trojan Horse.

The process of encrypting and transmitting query data packet with successive keys conventionally has been time consuming because of the high processor overhead involved in the encryption step when it is performed on the fly, as indicated at 104 in FIG. 4. This is because the encryption step 104 has been performed at scan time, immediately before the transmission of the query data packet at 106, as part of the scanning of network 10. In accordance with prior art scanning schemes, the costly encryption step is repeated each time through the loop. Indeed, in accordance with some prior art scanning schemes, the query data packet may be rebuilt at 102 each time through the network scan loop, as indicated by the dashed line in FIG. 4.

It will be appreciated by those skilled in the art that the prior art scheme can take hours or days of processor time scanning every port in every networked computer using every possible encryption key. As pointed out above, the loop may be repeated hundreds of millions of times to accomplish a single network scan for a given Trojan Horse. Thus, the overhead involved in performing a single given Trojan Horse scan of a network is huge.

Figure 5:
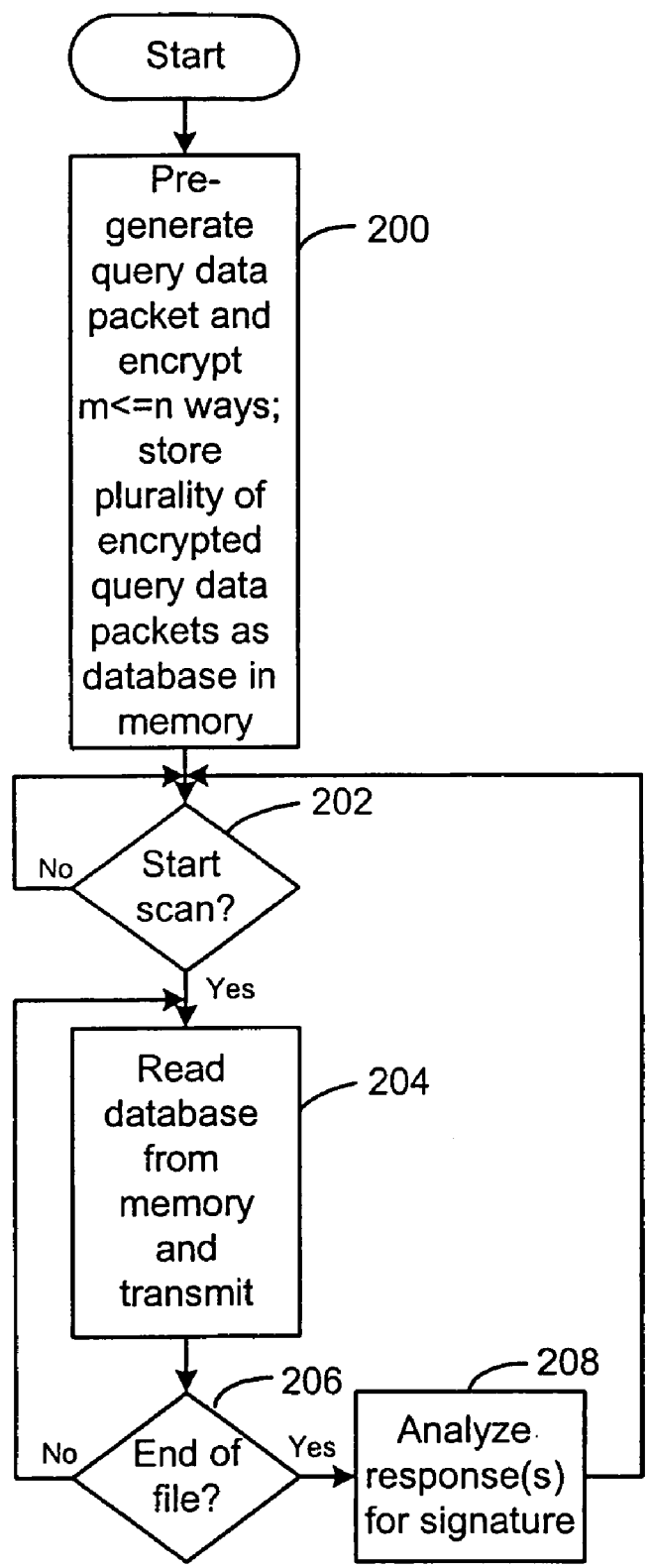
FIG. 5 is a flow chart illustrating the greatly improved pre-processing, encryption and caching method in accordance with the invention.

FIG. 5 illustrates the superiority of the invented method of scanning for a Trojan Horse. At 200 query data packet 26 is pre-generated to create a signature query to which a given Trojan Horse will respond when query data packet 26 is properly encrypted in accordance with an unknown key within the key space. Also at 200, the pre-generated query data packet 26 is encrypted using m≦n keys to create encrypted query data packet database 34 including encrypted query data packets 32a, 32b, 32c, . . . 32m. Finally, at 200, the plurality of encrypted query data packets are stored as database 34 in a memory 36 such as disk drive 38, RAM 40 or cache 42. The pre-generating, encryption and storage steps represented by block 200 will be referred to herein as network-vulnerability query data packet processing.

Those of skill in the art will appreciate that the method in accordance with the invention preferably is implemented in software within one or more server nodes charged with monitoring and maintenance of the network's security and performance. As such, the illustrated blocks of FIGS. 2 and 5 will be understood typically to be a part of a computer or microprocessor executing instructions residing in memory. Within the spirit and scope of the invention, they alternatively may be realized in firmware or hardware, within the spirit and scope of the invention. Those of skill in the art will appreciate that any suitable means of implementing the block diagram of FIG. 2 or the flowchart of FIG. 5 is contemplated as being within the spirit and scope of the invention.

Unless the Trojan Horse changes its signature or encryption key, the database that is created and stored at 200 need not be modified or updated. Thus, the database may be treated as a loadable object, may be archived, may be transmitted and may be transported from one computer to another as any other binary object. It will be appreciated that statistical methods regarding signature command and data formats for magic data field 26*a* and query data/command field 26*d* may be used in the pre-generation query data packet 26. Statistical methods regarding encryption may be used in and the encryption thereof to produce database 34 containing a plurality of encrypted query data packets to which the Trojan Horse or other network vulnerability will produce a signature response. Thus, it is contemplated that intelligence information may be lacking and that resort to known statistical methods will be required to carry out the invention.

Typically, a scanner like scanner module 16 scans a network periodically for a given Trojan Horse, thereby to ensure the integrity of the network and every computer and port connected therewith. In accordance with the invention, a scan when invoked at 202 simply reads and transmits the pre-generated, encrypted and stored database 34 from memory at 204 until an end-of-file indicator is encountered at 206. There is no need for repeated encryption of the query data packet on the fly as with prior art schemes, and there is thus no associated overhead in performing a network scan. When a response is received from a targeted computer or port within a defined time out, the scanner determines at 208 whether the respondent software is a Trojan Horse by analyzing its response for a signature. The scan of the network for a given Trojan Horse is easier and quicker by two orders of magnitude, in accordance with the invention, than by prior art schemes that are bogged down with encryption each and every time a network scan is needed, and throughout each such scan.

Those of skill in the art will appreciate that the determination at 208 whether the respondent software is a Trojan Horse relies on a signature response, rather than just any response. Typically, a Trojan Horse responds to a command embedded within either or both of magic data field 26*a* and/or query data/command field 26*d* with a modified data field within a data packet otherwise identical with the query data packet sent by scanner module 16. This signature response distinguishes a Trojan Horse from, for example, an echo data response from network maintenance or performance evaluation software that typically echoes data packets to the transmitter without modifying the data field.

Quick and efficient as the scanning processing is in accordance with the invention illustrated in FIG. 5, it may be made even faster and simpler. Because the database is stored in non-volatile memory such as a on a disk drive 38, there is a certain disk access latency involved even in reading each encrypted and stored query data packet in the database prior to the transmission of each packet. This latency may be avoided in substantial part by moving database 34 from non-volatile memory 36 to volatile memory such as a read access memory (RAM) 40 connected with the processor executing the scanner functions. Caching schemes are known to roll pages into fast RAM-type memory in anticipation of their being needed so that ideally no disk access latency would be realized by the processor during the read and transmit steps of the invented method. Thus, a memory configured as a cache of a form known to those of skill in the art may be used to store database 34. Any suitable caching and/or memory management, e.g. pipelining or direct memory access (DMA) scheme for increasing the effective bandwidth of the channel between the pre-processed, encrypted and stored database and the targeted network computer port is within the spirit and scope of the invention.

Thus, the invention may take the form of a computer-readable medium containing a program for detecting within a networked computer a target vulnerability residing therein, the vulnerability being characterized by a signature response to an encrypted query. The program includes means for encrypting a query data packet in accordance with a plurality of encryption keys to produce a plurality of encrypted query data packets, each encrypted query data packet including a defined query field specific to the target vulnerability. The program further includes means for storing the plurality of encrypted query data packets in a memory. Finally, the program includes means for scanning the networked computer for a target vulnerability residing therein by transmitting successive ones of the encrypted-and-stored query data packets to the networked computer and analyzing responses thereto from the networked computer with respect to the characteristic signature.

In accordance with a first embodiment of the invention, the storing is in a non-volatile memory, e.g. disk drive 38. Alternatively, and also within the spirit and scope of the invention, storing is in a random-access memory (RAM) 40. Most preferably, storing is in a memory configured as a cache 42.

Thus, in accordance with the invention, a query data packet is pre-generated, i.e. it is generated in advance and encrypted in accordance with m keys within a given key space to produce a plural-key encrypted and stored query database 34. Database 34 then is readily available for later repeated use in scanning for network culprits or vulnerabilities very quickly and efficiently. The Trojan Horse detector thus need only read the stored packets in from memory and transmit them in their plural key-encrypted succession to the networked computer, saving critical processing time per host computer heretofore spent generating and encrypting successive packets on the fly. Detection times are reduced by nearly two orders of magnitude, from minutes to seconds per target host computer. Moreover, false negative network scans—false indications that the network is safe from Trojan Horse infiltration and infection—are avoided.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

The invention claimed is:

1. A method, comprising:

formatting a data field of a query data packet with a banner, the banner configured to elicit recognition by a target software;

formatting a command field of the query data packet with a command, the command configured to elicit a signature response when the command is processed by the target software;

identifying a number of keys equal to a modulus of an operating system contained on first and second computers;

encrypting the query data packet with each of the keys to produce a multitude of encrypted query data packets equal in number to the modulus and the number of keys, each of the multitude of encrypted query data packets encrypted using a different one of the keys;

storing the multitude of encrypted query data packets in a storage medium;

sending the multitude of encrypted query data packets to the first computer to determine whether the first computer contains the target software;

observing that the first computer contains the target software when at least one of the encrypted query data packets elicits the signature response on the first computer; and scanning the second computer using the previously generated encrypted query data keys that are stored in the memory to determine whether the second computer contains the target software, the scanning occurring without generating a new query data packet and without re-encrypting the query data packet.

2. The method of claim 1 wherein the encrypted query data packets used to scan the second computer are a same, unmodified representation of the encrypted query data packets sent to the first computer.

3. The method of claim 1 wherein the encrypted query data packets used to scan the second computer are the same and generated at a same time as the encrypted query data packets sent to the first computer.

4. The method of claim 1 wherein the target software is Trojan Horse software residing in a port of the first computer.

5. The method of claim 1 further comprising:
repetitively reading the encrypted query data packets from the memory; and
repetitively scanning other computers using the encrypted query data packets that are read from the memory without formatting the encrypted query data packets and without generating new query data packets.

6. The method of claim 1 wherein the modulus is equal to the product of 1024 and a bit capability of the operating system.

7. The method of claim 1 wherein the storage medium is a non-volatile memory.

8. The method of claim 7 further comprising:
moving the non-volatile memory containing the encrypted query data packets from a first scanning device that was used to scan the second computer to a second scanning device; and
scanning a third computer with the second scanning device, the scanning of the third computer performed using a same, unmodified representation of the encrypted query data packets read from the non-volatile memory.

9. An apparatus comprising:
one or more processors for encrypting a query data packet in accordance with a plurality of different keys to generate a plurality of differently encrypted query data packets, the differently encrypted query data packets including one or more fields configured to elicit a signature response from a Trojan Horse;
a memory device for storing, at a first time, a database comprising the differently encrypted query data packets;
a transmitter for scanning a port on a computer, the scanning occurring at a second time that is later than the first time, the scanning using the database that was stored at the first time such that the scanning of the computer does not require on-the-fly generation of additional encrypted query data packets; and
an analyzer for analyzing whether the computer processes the signature response in response to the scanning using the database.

10. The apparatus of claim 9 wherein said memory device is non-volatile.

11. The apparatus of claim 9 wherein said memory device is a random-access memory (RAM).

12. The apparatus of claim 9 wherein said memory device is organized as a cache.

13. The apparatus of claim 9 wherein the keys are equal in amount to a modulus of an operating system contained on the computer.

14. An apparatus, comprising:
one or more processors; and
a memory coupled to the processors comprising instructions executable by the processors, the processors operable when executing the instructions to:
format a query data packet to elicit a signature response when the query data packet is processed by a target software;
identify a plurality keys, an amount of the keys corresponding to an operating system contained on first and second computers;
encrypt the query data packet with the keys to produce a multitude of encrypted query data packets equal in number to the amount of keys, each of the multitude of encrypted query data packets encrypted using a different one of the keys;
store the multitude of encrypted query data packets in a storage medium;
send the multitude of encrypted query data packets to the first computer to determine whether the first computer contains the target software;
observe that the first computer contains the target software when at least one of the encrypted query data packets elicits the signature response on the first computer; and
scan the second computer using the previously generated encrypted query data keys that are stored in the memory to determine whether the second computer contains the target software, the scanning occurring without requiring generation of a new query data packet and without requiring re-encryption of the query data packet.

15. The apparatus of claim 14 wherein the amount of keys is equal to a modulus of the operating system.

16. The apparatus of claim 14 wherein the encrypted query data packets used to scan the second computer are the same and generated at a same time as the encrypted query data packets sent to the first computer.

* * * * *